29. The method of claim 1 wherein said borane is diethyldecaborane, wherein said acetylenic hydrocarbon is acetylene and wherein said material is a mixture of di-n-butyl ether and di-n-propyl sulfide.

30. Compounds selected from the class consisting of $RR'B_{10}H_8(CR''CR''')$ and $(RR'B_{10}H_8)_2(CHCR_1CCH)$ wherein R and R' are each selected from the class consisting of hydrogen and alkyl radicals containing from 1 to 5 carbon atoms, wherein R'' and R''' are each selected from the class consisting of hydrogen, an alkyl radical and a monoalkenyl hydrocarbon radical, the total number of carbon atoms in R'' and R''' taken together not exceeding eight and wherein $R_1$ is a bivalent hydrocarbon radical containing from 1 to 6 carbon atoms.

31. $C_2H_5B_{10}H_9(CHCH)$.
32. $B_{10}H_{10}(CHCH)$.
33. $B_{10}H_{10}(CHCCH_3)$.
34.

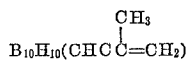

35. $B_{10}H_{10}(CHC(CH_2)_3CH_3)$.
36. $B_{10}H_{10}CHC(CH_2)_2CH_3$.
37. $B_{10}H_{10}C(CH_2CH_2CH_3)C(CH_2CH_2CH_3)$.
38. $B_{10}H_{10}CHC(CH_2)_3CCHB_{10}H_{10}$.
39.

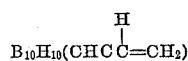

40. $(C_2H_5)_2B_{10}H_8(CHCH)$.

41. A method for the production of an organoboron compound useful as a fuel which comprises reacting with the formation of hydrogen a borane selected from the group consisting of decaborane and alkyl decaboranes having from one to two alkyl groups containing from one to five carbon atoms in each alkyl radical and an acetylenic hydrocarbon containing from two to ten carbon atoms while the reactants are in admixture with a material selected from the group consisting of hydrogen cyanide, nitriles of saturated and unsaturated aliphatic mono- and dicarboxylic acids containing 2 to 5 carbon atoms, $\beta,\beta'$-oxydipropionitrile, lower monoalkyl amines, lower dialkyl amines, alkylene diamines containing 2 to 8 carbon atoms, lower dialkyl sufides and diphenyl sulfide.

42. Compounds depictable by the formula
$$(R'')_nB_{10}H_{10}(CRCR')$$
wherein R and R' are each selected from the group consisting of hydrogen, alkyl radicals and monoalkenyl hydrocarbon radicals, the total number of carbon atoms in R and R' being from 0 to 8; R'' is a lower alkyl radical; and $n$ is an integer between 0 and 2, inclusive.

No references cited.

TOBIAS E. LEVOW, Primary Examiner

W. F. W. BELLAMY, Assistant Examiner

U.S. Cl. X.R.

149—22; 44—76